July 15, 1969 C. J. KOESTER 3,456,211
FIBER LASER STRUCTURES AND THE LIKE
Filed June 16, 1966 2 Sheets-Sheet 1
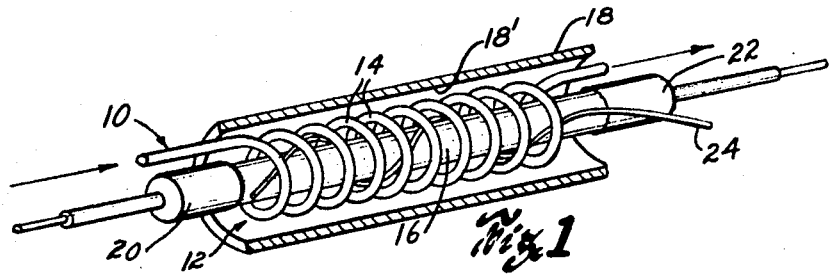
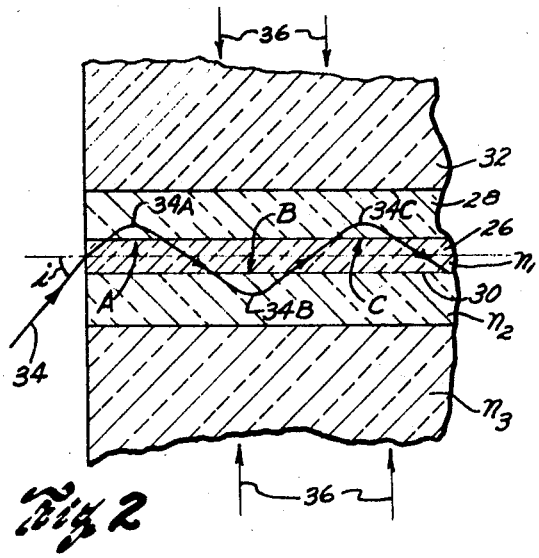
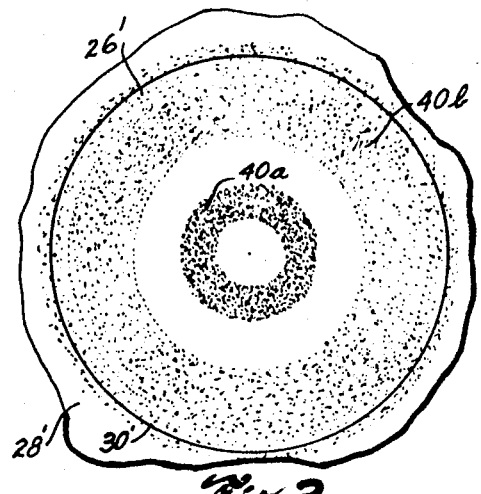
Fig 6 +
col. 6
Liquid
Cladding
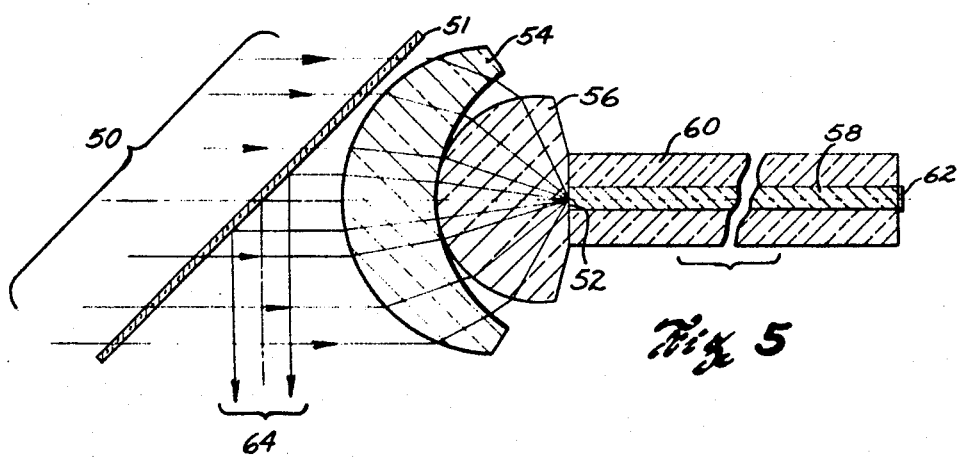
INVENTOR.
CHARLES J. KOESTER
BY Robley J. Williams
ATTORNEY

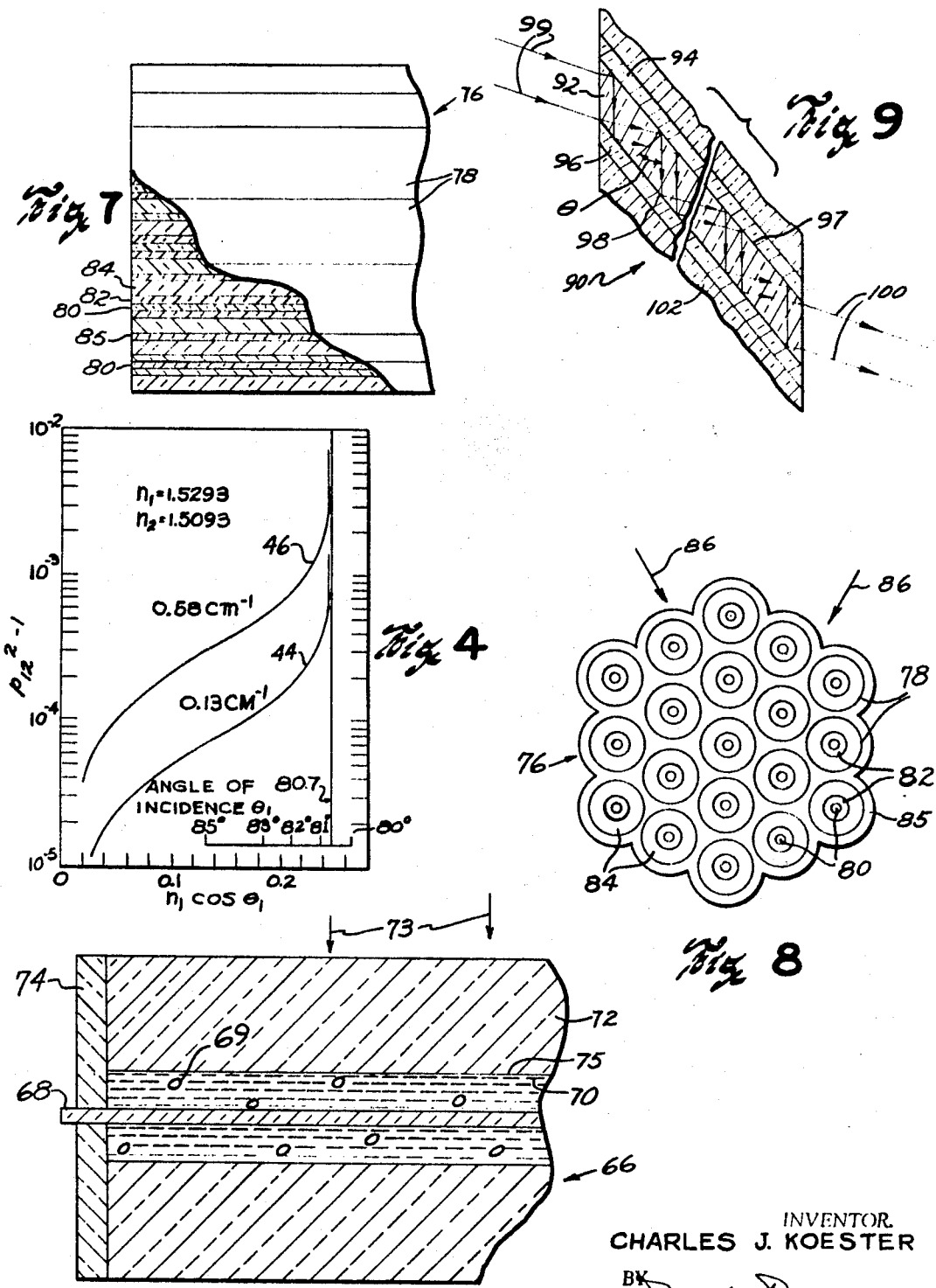

United States Patent Office 3,456,211
Patented July 15, 1969

3,456,211
FIBER LASER STRUCTURES AND THE LIKE
Charles J. Koester, South Woodstock, Conn., assignor, by mesne assignments, to American Optical Corporation, a corporation of Delaware
Filed June 16, 1966, Ser. No. 558,009
Int. Cl. H01s 3/02, 3/08
U.S. Cl. 331—94.5                                    10 Claims This invention relates to fiber optical light-generating and light-amplifying means and the like.

More particularly, the invention relates to fiber optical laser light-generating and laser-light amplifying means of novel constructions and arrangements employing one or more thin, elongated fiber optical components and with each component comprising a relatively thin, elongated fiber-like core or such of optically transparent material of passive characteristics and of suitable cross-sectional size, and of a relatively high predetermined refractive index value, surrounded by a cladding of material of a relatively lower predetermined refractive index value and having active laser characteristics or an active laser ingredient dispersed therein, said cladding material being arranged in surrounding relation to the side wall portions of said fiber-like core in such a manner as to be in good optical contact therewith, whereby optical energy, such as an optical signal or the like, directed into an end of said transparent passive fiber-like core for transmission therethrough in accordance with the principles of total internal reflection will have a substantial part of this energy penetrate into the travel within the active cladding material and will produce stimulated emission within the cladding material which is being at the same time optically pumped by suitable pumping means associated therewith with the result that said signal will be materially enhanced or strengthened thereby.

It is already known that light generation and light amplification by stimulated emission of radiation at a predetermined fluorescent wavelength can be produced in an elongated fiber optical component comprising a core of active laser material of a predetermined refractive index value surrounded by a cladding of transparent passive material of a relatively lower refractive index value when suitably optically pumped. One example of such an already known thin, elongated fiber optical laser component comprises a core of trivalent neodymium-doped barium crown glass of a known refractive index value and high optical qualities surrounded by a cladding of transparent glass of passive characteristics and of a relatively lower refractive index value such as a soda-lime-silicate glass in side-wall contacting relation therewith.

In many incidences, however, otherwise suitable materials such as carefully prepared glasses containing active laser ingredients therein cannot be made to lase readily int the conventional fashion due in part, at least, to various related and hard to control conditions, such as the presence of bubbles, striae, impurities, or the like therein. Also, certain other laser materials cannot be made into elongated fiber-like laser structures so as to undergo laser action (stimulated emission of radiation) when pumped in the usual fashion because of the inhomogeneous nature of the material itself. Also, in still other instances, otherwise laserable materials may be of such physical characteristics that they cannot be readily drawn out into fiber-like form and, accordingly, could not possibly be used in a fiber-like laser structure or the like.

It has now been found, however, insofar as laser light-generation and laser light-amplification are concerned, that desirable results can be obtained by following the teachings of the present invention wherein by the use of a relatively thin, elongated transparent fiber optical core or central element formed of a glass of a passive type and having a relatively high refractive index value and by providing a suitable cladding in good optical contact with side-wall portions thereof, said cladding being formed of laser material such as a suitable laser glass, plastic, gas, or liquid and having a predetermined lower refractive index value than said central element, a laser component of novel construction capable of stimulated laser emission may be made.

It is also an object of the present invention to provide in such a laser structure having an optically transparent passive central core or element and cladding of laserable material thereon, suitable means in the form of an optically finished end surface or end surfaces for allowing an optical signal of suitable wavelength to enter said component therethrough during pumping of the laser material and to allow this signal in amplified form to pass out of the structure therethrough.

Other objects and advantages of the invention will be apparent from the detailed description which follows when taken in conjunction with the accompanying drawings in which:

FIG. 1 is a perspective and partly broken-away view of structure embodying the present invention and comprising a fiber laser amplifier component;

FIG. 2 is an enlarged fragmentary longitudinal sectional view of a portion of a fiber laser component such as might be used in the structure of FIG. 1;

FIG. 3 is an enlarged fragmentary end view of a laser core and adjacent cladding similar to that shown in FIG. 2 and shows a light distribution pattern superimposed thereon;

FIG. 4 is a graph showing curves for enhanced total internal reflection;

FIG. 5 is a longitudinal sectional view of a modified form of structure embodying the invention and arranged in the form of an end-pumped laser light generator;

FIG. 6 is a further modified form of structure embodying the invention;

FIG. 7 is a side elevational view, partly broken away, showing another modified form of structure embodying the invention;

FIG. 8 is an end view of the structure of FIG. 7; and,

FIG. 9 is a further modified form of laser structure embodying the invention.

Referring to the drawing in detail and in particular to the apparatus of FIG. 1, it will be seen that the numeral 10 indicates generally a thin, elongated fiber laser component formed into a helically-shaped coil 12 comprising a large number of connected convolutes 14 which are arranged in encircling relation to an elongated flashtube 16. Corresponding parts of adjacent convolutes are shown in spaced relation to each other but in practice would be arranged as close to each other as practical. Around the coil 12 and flashtube 16 is concentrically arranged an elongated cylindrically-shaped reflector 18 which is highly polished upon its inner surface 18'. The flashtube 16, as shown, is provided at its opposite ends with a pair of spaced electrodes contained within a pair of ceramic mounting blocks 20 and 22, in usual fashion. (Of course, other types of flashtubes might be used.) The flashtube is provided with an encircling high potential triggering lead 24 of usual kind.

A longitudinal sectional view of an end portion of the elongated fiber laser component 10 is shown in FIG. 2 and comprises a fiber-like core 26 formed of clear light-transmitting passive material having a predetermined relatively high refractive index value $n_1$, surrounded by a first cladding 28 of an active laser material which has a relatively lower refractive index value, $n_2$, when compared with that of said core. The cladding material completely surrounds the smooth side-wall portions of the core and is in good contacting relation therewith in such a manner as to form interface 30 of high optical quality. About the first cladding 28 of laser material and which need be only of a small thickness, is disposed a second materially thicker cladding 32 of a light-transmitting passive material having a refractive index value $n_2$ of nearly the same but slightly greater value than that of said first cladding.

The material of the passive core 10 may be, if desired, a soda-lime-silicate clear glass having a refractive index value in the neighborhood of 1.529 while the material of the first cladding may be a trivalent neodymium-doped barium crown laser glass having a refractice index value of about 1.509. The material of said second cladding may be a clear soda-lime-silicate glass having a slightly higher refractive index value, such as 1.510.

If an optical signal, for example, like that indicated by the light ray 34 in FIG. 2, is directed at or within a suitable angle of incidence $i$ into the end of the thin, elongated transparent core 26, it will tend to pass in accordance with the principles of total internal reflection through the core 10 from end-to-end thereof while experiencing (in a small diameter fiber) a large number of successive reflections at a series of spaced locations along the interface 30.

A series of such spaced locations is indicated generally by letters A, B and C. However, at each internal reflection of such a light ray there has been found to be some penetration of the light into the cladding material of lower refractive index, and such minute penetration is indicated by curved portions 34A, 34B and 34C of light ray 34.

It has now been found that by forming this lower refractive index cladding material in the form of an active fluorescent or laser material (one which is susceptible to stimulated emission of radiation, that is, one in which it is possible to establish an inversion of population) light which penetrates into the laser material during suitable optical pumping thereof will couple into and cause stimulated emission of that part of the pumping light which is in phase with and in the same mode as the light which penetrates and stimulates the emission. In other words, the evanescent waves associated with the light which penetrates beyond the boundary will stimulate emission and will thus be amplified. Effectively, each successive total internal reflection at the interface 30 will be to a degree enhanced or amplified. Of course, the accumulative effect at the many successive reflections of the light ray along the length of the fiber core will collectively materially enhance the signal.

Laser action, in fact, has been obtained while using an arrangement of parts like that shown in FIG. 1. A one meter long component comprising a core of clear glass, a first cladding of laser glass and a second cladding of clear glass was formed into a helically coiled shape which consisted of about twenty convolutes and was disposed about a suitable thin, elongated flashtube which had an active portion of about 3 inches in length. The clear glass of the core had a refractive index value of about 1.529 and a diameter of approximately 8.2 microns. The first cladding was formed of a 5% neodymium-doped barium crown laser glass having a 1.509 refractive index value and an outside diameter of approximately 26$\mu$. The second cladding of clear passive glass, which was added partly, at least, for mechanical strength and partly for pump light collecting purposes had a refractive index value of approximately 1.510 and an outside diameter of 1.5 millimeters.

When the component was pumped by means of the flashtube, laser oscillation was observed. For an arrangement much like that of FIG. 1, oscillation threshold was reached at 230 joules of input power. In this structure, the ends of the component were normal to the axis of the component. It has been determined that the laser light obtained was actually carried principally in the core material. This was established by photographing the end of a passive core fiber laser component using its own emitted light. This light was found to emerge almost entirely from the passive core. In addition, when a beam of optical energy at 1.06$\mu$ wavelength was directed into an end of the passive core of such a component, and the component simultaneously side-pumped, amplification of the signal was observed.

Because of the refractive index relationship of $n_2 < n_3 < n_1$ which exists for a component like that of FIG. 2, light guiding action by total internal reflection is to be expected only in the clear passive fiber core. No light will be guided by the lower index neodymium-doped cladding material by total internal reflection. This can be verified experimentally by illuminating one end of the passive core fiber component first with visible light, and thereafter with infra-red radiation at 1.06$\mu$. (In the latter instance, an infra-red image converter can be used for viewing the exit end of the component.) In both cases, the core appeared bright and the neodymium cladding appeared dark. However, upon illuminating one end of a fiber-like core of neodymium-doped laser glass which is clad with a lower index layer of clear glass, with visible light, the core appeared bright red and the cladding appeared dark. Thus, it is evident that the light guiding effect and not the absorption is responsible for the observed results.

When a straight laser component of the type described and using a core 26' of clear passive material and having a cladding 28' of laser glass thereon was placed adjacent a straight flashtube which was being intermittently pulsed with 2900 joules of power, oscillation occurred. Using a microscope objective to image the exit end of this laser component on an infra-red sensitive photographic plate, photographs thus obtained revealed that, for the near field, almost all of the energy emerged from the passive core 26' and only a small amount appeared outside the core-cladding interface 30'. When the far field pattern (not shown) of energy from the exit end of this component was photographed on an infra-red sensitive plate placed approximately 11 mm. from the end of the component, the energy distribution pattern produced looked much the same as that indicated in FIG. 3 but, of course, was of slightly larger size.

Note that while a first inner ring-like shaded area 40$a$ and a second outer ring-like shaded area 40$b$, indicate spaced areas of light distribution, nevertheless, substantially no light is indicated in the central area within inner ring 40$a$ and no light is indicated in the space between these two ring-like areas. Thus, most of the energy being projected from the laser component is contained in two hollow cones of light of half angles of approximately 3.6° and 12.1° respectively.

When the ends of a component like that in FIG. 1 were bevelled so as to be flat and at about 20° to the axis of the component, so as to reduce Fresnel reflections from the end glass-to-air surfaces to a minimum and thereby reduce feedback, high inversion and good laser amplification was obtained. The ratio, $e$, of signal output when pumped to signal output when unpumped was found to give $e^{\beta l}$ equal to 26.6; which for a length ($l$) of 1 meter corresponds to a gain coefficient $\beta$ equal to .033 cm.$^{-1}$.

The interpretation of the laser oscillation and laser amplification obtained is that when the input signal or radiation (at 1.06 for neodymium laser glass, for example,) is reflected at the core-cladding interface, that portion of the energy which penetrates beyond the boundary produces stimulated emission, and the net effect is that a reflection coefficient at the core-cladding interface which is, in effect, greater than unity results.

The reflection coefficient when related to the depth of penetration of the radiation into the laser cladding provides a coefficient which increases as the angle of incidence at the interface decreases from grazing incidence to the critical angle for the core and cladding index combination being employed. This would lead to a hollow cone energy output mode pattern. In mode description, those modes closest to cutoff should be favored over those far from cutoff since those close to cutoff have a larger fraction of their energy in the cladding.

Reflection coefficients at an oblique incidence at the interface between the passive core and the active cladding material will now be discussed. The expressions for reflection coefficient at a dielectric-conductor interface are known. Adapting these expressions to the instant application requires two changes: firstly, that the extinction coefficient, $k$, have a negative value because of the amplification, and secondly that $(k)$ can be taken to be very small, thus allowing simplification.

Real quantities $u_2$ and $v_2$ may be expressed as follows:

$$n_2(1+ik_2) \cos \theta_2 = u_2 + iv_2 \quad (1)$$

wherein $\theta_2$ is the angle which satisfies the modified Snell's law.

$$n_2(1+ik_2) \sin \theta_2 = n_1 \sin \theta_1 \quad (2)$$

and $\theta_1$ is the angle of incidence in the first (core) medium.

Squaring Equation 2 and equating real and imaginary parts yields the expressions:

$$2u_2^2 = n_2^2(1-k_2^2) - n_1^2 \sin^2\theta_1$$
$$\pm \sqrt{[n_2^2(1-k_2^2) - n_1^2 \sin^2\theta_1]^2 + 4n_2^4 k_2^2} \quad (3)$$

$$2v_2^2 = -[n_2^2(1-k_2^2) - n_1^2 \sin^2\theta_1]$$
$$\pm \sqrt{[n_2^2(1-k_2^2) - n_1^2 \sin^2\theta_1]^2 + 4n_2^4 k_2^2} \quad (4)$$

The $\pm$ signs arise because each equation is obtained by solving a quadratic form.

The reflectance is given by the following expression:

$$\rho_{12}^2 = \frac{(n_1 \cos \theta_1 - u_2)^2 + v_2^2}{(n_1 \cos \theta_1 + u_2)^2 + v_2^2} \quad (5)$$

Utilizing the fact that $[k_2] \ll 1$, and then substituting $\eta = n_1 \cos \theta_1$, we obtain $$\rho_{12}^2 = 1 - \frac{4\eta n_2^2 k_2}{(n_1^2 - n_2^2)\sqrt{n_1^2 - n_2^2 - \eta^2}} \quad (6)$$

The reflectance is less than unity for $k_2$ positive (absorbing medium) and greater than unity for $k_2$ negative (amplifying medium). Equation 6 is valid only for the angular region corresponding to total internal reflection; that is $\eta^2 < n_1^2 - n_2^2$.

Equaton 6 was used to calculate the reflectance as a function of angle of incidence for the two assumed values of $k_2$. The values of $k$ are derived from measured gain coefficients in fiber laser amplifiers. The results are plotted as curves 44 and 46 in FIG. 4 to show enhanced total internal reflection. The upper curve was calculated for $k_2 = -3.24 \times 10^{-6}$ which corresponds to a gain coefficient of 0.58 cm.$^{-1}$ in the active material. The lower curve was calculated using $k_2 = -.725 \times 10^{-6}$ which corresponds to a gain coefficient of 0.13 cm.$^{-1}$ in the active material.

The curves show the expected increase of reflectance as the critical angle is approached. For curve 46 wherein $\beta$ equals .58 cm.$^{-1}$, it appears that a reflection enhancement of 0.1% or greater can be obtained over an angle of 1 from the critical angle. The curves also allow a rough prediction of the gain per unit length to be expected for the passive core laser component.

The number of reflections of a meridional ray per cm. of length is given by the equation.

$$m = \frac{\sin \phi_1}{d} \quad (7)$$

wherein $d$ is the diameter and $\phi_1$ equal to $90° - \theta_1$ is the angle of the ray relative to the axis of the fiber. Therefore, the expected gain per cm. is $$\beta = \frac{\sin \phi_1}{d} (\rho_{12}^2 - 1) \quad (8)$$

As an example, take $\sin \phi_1$ equal to $0.21 \div 1.529$, $d = 8\mu$ and $(\rho_{12}^2 - 1)$ equal to $1.8 \times 10^{-4}$ for a value of $k_2 = 0.13$ cm.$^{-1}$. The value $n \sin \phi_1 = 0.21$ is that obtained from the outer dark ring area 48 in FIG. 3. Then $\beta$ is equal to 0.031 cm.$^{-1}$. This value is in keeping with the gain measured in the coiled passive core laser component of FIG. 1.

For a given clad fiber component higher order modes in general have larger fractions of the transmitted power in the cladding than do the lower order modes. It is, therefore, to be expected that in a component capable of supporting several modes, the passive core-active cladding arrangement of the instant invention will favor the higher order modes. In the $8\mu$ passive core component herein disclosed the $TE_{02}$ and the $TM_{02}$ modes were the highest order allowed. In waveguide mode terminology, a portion of the power is carried in the cladding and stimulated emission produced in the cladding then couples additional power into the mode and results in amplification in the mode.

While in most earlier fiber laser structures high optical quality in the laser material was necessary for stimulated emission of radiation, a significant advantage in the instant invention is that the active material does not have to possess such high optical quality. For example, in the constructional arrangement in FIG. 6 is shown an end portion of an elongated laser component 66 comprising a thin, elongated core 68 of clear passive transparent material of relatively high refractive index surrounded by a liquid 70, such as an europium chelate, of lower refractive index material and which liquid has such active fluorescent or laser characteristics that light travelling by total internal reflection down the core 68 will penetrate this liquid and be enhanced by laser energy received therefrom even though this liquid is of somewhat inhomogeneous character or may contain an occasional inclusion, or bubble or the like as indicated at 69 therein. It will be appreciated, of course, that the above-mentioned inclusion or inherent limiting conditions might very well be such that the laser liquid containing same would be so affected thereby that it could not possibly be made to undergo by itself laser action.

An outer transparent cladding 72 (which admits side pumping light as indicated by arrows 73) and end caps, such as shown at 74, form a chamber 75 for confining the laser liquid. The passive fiber core in this construction could act as an oscillator or an amplifier depending upon the angle and end reflectivity thereof or the absence of such reflectivity. Obviously, only a small amount of laser material will be needed in this arangement since penetration of the conducted light into the laser material of only a few wavelengths in depth is required.

Instead of the active laser material at 70 in FIG. 6 being in the form of a liquid, it might instead be in the form of a known laserable gas or gases, such as a suitable mixture of helium and neon which emits in the infra-red region at about $3.39\mu$ when sufficiently stimulated.

In the end pumping constructional arrangement of FIG. 5, a substantially parallel beam of optical energy, as indicated by arrows 50, from an arc lamp or other high intensity light source of limited size, may be directed through a beam-splitting dichroic mirror 51 and focused by aplanatic lens means 54 and 56 so as to impinge as a high intensity light source image upon the entrance end 52 of a fiber-like core 58 of clear glass of a passive type and of a relatively high refractive index value. The core is surrounded by a cladding 60 of active laser glass of a relatively lower refractive index value. The laser material need not be of high optical quality and might even be strongly absorbent at the pumping wavelength bands therefor.

The flat end surface 52 cooperates with a 100% reflective mirror 62 at the opposite end of the core in defining an optical resonant cavity including the passive core 58 therebetween. Pumping light travelling down the length of the core 58 by total internal reflection will experience some penetration into and out of parts of this active laser cladding material at each reflection even though it may not be, for example, of the best optical quality.

Oscillations will thus be produced within the cavity so provided between the surfaces 52 and 62 and some of this light will penetrate the laser material somewhat and produce stimulated laser emission, and the amplified emitted laser light so produced will pass out through the clear end surface 52 so as to be directed as substantially collimated light by mirror 51 in the direction of the arrows 64.

In the partial side elevational view and the end view of FIGS. 7 and 8, respectively, is shown a laser construction or assembly 76 which may comprise a plurality of similar thin, elongated laser components 78 each formed by a transparent passive core 80 of relatively high refractive index glass, a thin first cladding 82 of an absorbing laser glass of a relatively lower refractive index value and a much thicker outer second cladding 84 of transparent glass of a passive type and of only a slightly higher refractive index value than that of the first cladding.

The second cladding material could also be of lower melting characteristics, if desired, so as to allow the plurality of components to be fused together by the glass of said second cladding in any spatial arrangement needed. It might be preferable, however, to employ in addition to the parts just mentioned another glass of lower melting characteristics, such as suggested at 85 in FIG. 8, for surrounding and fusing these several individual laser components together. In such an arrangement using the lower melting glass for fusing-together purposes, a consideration as to its refractive index characteristics would not be required. In such an arrangement as shown in FIGS. 7 and 8, separate optical signals could be simultaneously transmitted into and through the individual passive cores 80 of the assembly while the assembly is being side pumped by an encircling flashtube or bank of flashtubes or the like (not shown) as suggested by the several arrows 86.

In FIG. 9 is shown a somewhat modified laser component 90. This component comprises a thin, wide elongated central ribbon-like element 92 formed of glass of a passive type and centrally disposed between a pair of similar thin, wide elongated ribbon-like layers 94 and 96 formed of glass of an active laser type. The glass of element 92 has a relatively high predetermined refractive index value, $n_1$, and the glass of layers 94 and 96 have a relatively lower refractive index value, $n_2$. The opposed upper and lower surfaces of the central ribbon-like element 92 are of good smooth optical quality so as to provide good optical interfaces 97 and 98 therebetween.

The parts just described could be strengthened, if desired, by outer thicker layers of transparent glass 102 of about the same or slightly higher refractive index than that of layers 94 and 96. When such a structure is being optically side pumped while a collimated beam, 99, of optical energy of a suitable wavelength is being injected into the structure at one end thereof, and at a proper angle of incidence so as to be near the critical angle $\theta$ for totally internally reflecting energy at the interfaces 97 and 98 (that is, $n_1 \sin \theta \geq n_2$), this energy will be reflected at successive points along said interfaces. At each of these reflections, the energy will penetrate into the laser material of the layers 94 and 96 and will be enhanced or strengthened with the result that an amplified plane beam 100 will egress from the opposite end of the central element 92.

While in the preceding disclosure a passive fiber core diameter of 8.2μ has been given in a workable example, it should be kept in mind that other sizes for the passive core diameter, both smaller and larger, may be used successfully. Likewise, various small thicknesses for the ribbon-like central element 92 may be used and when the smaller sizes and thicknesses are used, mode propagation will also result.

A neodymium laser glass has already been mentioned as a suitable material for cladding the passive central element or core of the laser components of the present invention. Other suitable laser glasses would include ytterbium laser glasses and holmium laser glasses.

In cases wherein gas is used as the active laser cladding material as suggested above, it would be possible to use instead of the optical pumping source of external energy as suggested by arrows 73 in FIG. 6, a pair of spaced electrodes (not shown) arranged to extend into the gas at opposite ends of the gas-confining chamber for supplying, in known fashion, a high potential supply of electrical energy, or even possible to use (in known fashion) an adjacent electrical induction pumping source of energy for producing laser action in said cladding gas.

Having described my invention, I claim:

1. A laser construction comprising at least one elongated laser component, said component comprising a centrally disposed elongated element formed of a glass of passive characteristics and having a predetermined refractive index, said elongated element being many times longer than the maximum transverse dimension thereof and having spaced optically finished opposed side-wall surface portions formed thereon and extending substantially throughout the length of said element, a cladding of active laser material disposed in optical contact with opposed side-wall surface portions in such a manner as to form good optical interfaces arranged in spaced facing relation to each other throughout substantially the entire length of said elongated element, said cladding of active laser material having a refractive index of a lesser predetermined value than that of said elongated element, said cladding in its operating position upon said elongated element having such restrictive optical and physical characteristics that said cladding, in and of itself, cannot support laser oscillation during pumping of said construction, said elongated element being optically transparent to energy at the emission wavelength of said laser material, whereby, when said construction is suitably pumped by energy from an external source to produce an inversion of population in said laser material and an emission of radiation therefrom, some of this light at the emission wavelength of said laser material will couple into said elongated element and will travel by the process of total internal reflection lengthwise within and at near critical angle and will be strengthened by penetration into the cladding of laser material at each successive reflection thereof.

2. A laser construction as defined in claim 1 wherein said elongated element has its opposite ends flat and optically finished, and each flat end is arranged in predetermined angular relation to the elongated element adjacent thereto.

3. A laser construction as defined in claim 2 wherein said construction is intended to function as a laser amplifier and the flat end surface of the elongated element thereof which is acting as the exit end thereof is disposed upon said elongated element at such an angle as to direct all internal light incident thereon in such a direction as to pass out of said element without travelling back down said element in such a way as to affect the gain thereof.

4. A laser construction as defined in claim 2 wherein said construction is intended as a laser oscillator and the flat end surfaces of said elongated element are each arranged substantially at right angles to that part of the elongated element adjacent thereto so as to enhance the laser action of said construction.

5. A laser construction as defined in claim 1 wherein said elongated element is of a predetermined thickness in a first transverse direction thereof and is of a fraction of such thickness in a second transverse direction at right angles thereto.

6. A laser construction as defined in claim 1 wherein said elongated element is in the form of a relatively thin fiber-like core, and the active laser material in optical contact with the side-wall portions thereof completely surrounds said fiber-like core throughout substantially the entire length thereof.

7. A laser construction as defined in claim 1 wherein said elongated element is in the form of a thin ribbon-like member, and said active laser material is in the form of ribbon-like layers in optical contact with the opposed spaced side-wall surface portions thereof throughout substantially the entire length of said element 8 A laser construction as defined in claim 1 wherein said cladding of active laser material disposed in optical contact with said side-wall surface portions of said elongated element is glass.

9. A laser construction as defined in claim 1 wherein said cladding of active laser material disposed in optical contact with said opposed side-wall surface portions of said elongated element is in the form of a laserable gas and is confined in such contacting relation by enclosing means in surrounding relation therewith.

10. A laser construction as defined in claim 1 wherein said cladding of active laser material disposed in optical contact with said opposed side-wall surface portions of said elongated element is in the form of a laserable liquid and is confined in such contacting relation by enclosing means in surrounding relation therewith.

References Cited
UNITED STATES PATENTS 3,219,585   11/1965   Kaiser _____ 331—94.5

RONALD L. WIBERT, Primary Examiner

WILLIAM L. SIKES, Assistant Examiner

U.S. Cl. X.R.

350—96